US010609118B2

(12) United States Patent
Burton et al.

(10) Patent No.: US 10,609,118 B2
(45) Date of Patent: Mar. 31, 2020

(54) ADAPTIVE COMMUNICATION CONTROL DEVICE

(71) Applicant: INTERNATIONAL BUSINESS MACHINES CORPORATION, Armonk, NY (US)

(72) Inventors: Peter H. Burton, Vancouver (CA); Shahir A. Daya, North York (CA); Luc Desrosiers, Hampshire (GB); Manvendra Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/458,369

(22) Filed: Mar. 14, 2017

(65) Prior Publication Data

US 2018/0270291 A1 Sep. 20, 2018

(51) Int. Cl.
*H04L 29/08* (2006.01)
*G06F 1/26* (2006.01)
(Continued)

(52) U.S. Cl.
CPC .............. *H04L 67/06* (2013.01); *G06F 1/266* (2013.01); *G06F 9/45558* (2013.01);
(Continued)

(58) Field of Classification Search
CPC ... H04W 72/085; H04W 24/08; H04W 28/08; H04W 72/10; H04W 28/0221; H04W 28/0231; H04W 52/0219; H04W 52/0225; H04W 52/0232; H04W 52/0258; H04W 52/0277; H04W 72/048; H04W 72/0493;
(Continued)

(56) References Cited

U.S. PATENT DOCUMENTS 7,020,438 B2   3/2006  Sinivaara et al.
7,853,862 B2  12/2010  Lakkis
(Continued)

FOREIGN PATENT DOCUMENTS

CA       2653862 C     11/2015
WO    2014110147 A1    7/2014
(Continued)

OTHER PUBLICATIONS

Peter Mell et al, The NIST Definition of Cloud Computing, National Institute of Standards and Technology, Publication 800-145, 2011.
(Continued)

*Primary Examiner* — Hitesh Patel
(74) *Attorney, Agent, or Firm* — Patrick J. Daugherty; Daugherty & Del Zoppo Co., LPA (57) ABSTRACT

Aspects control data transfers within group of networked devices. The devices are assigned a power values indicative of a relative quality of power supply, connection values indicative of a relative quality of network connections available, and master state values as a function of a comparing historical usage data. The devices with a highest combination value generated from the assigned master state, power and connection values is set as a master device to receive the data item and transfer the data item to each of other devices as client devices relative to the master device.

19 Claims, 5 Drawing Sheets

(51) Int. Cl.
*G06F 9/455* (2018.01)
*H04L 12/24* (2006.01)
*H04L 12/26* (2006.01)

(52) U.S. Cl.
CPC ...... *H04L 41/0893* (2013.01); *H04L 43/0876* (2013.01); *H04L 67/303* (2013.01); *G06F 2009/45579* (2013.01); *H04L 41/0806* (2013.01); *H04L 41/5019* (2013.01)

(58) Field of Classification Search
CPC .............. H04W 72/08; H04W 72/1257; H04L 12/2803; H04L 43/08; H04L 43/0876
See application file for complete search history.

(56) References Cited

U.S. PATENT DOCUMENTS

| | | | |
|---|---|---|---|
| 8,073,923 | B2 | 12/2011 | Engebretsen et al. |
| 8,929,251 | B2 | 1/2015 | Sasaki et al. |
| 2009/0257369 | A1* | 10/2009 | Igarashi ............ H04W 52/0261 370/311 |
| 2014/0244714 | A1 | 8/2014 | Heiby |
| 2014/0293829 | A1* | 10/2014 | Visuri .................. H04L 12/145 370/254 |
| 2014/0362728 | A1 | 12/2014 | Krochmal et al. |
| 2019/0068255 | A1* | 2/2019 | Bolotin ................ H04B 7/0452 |

FOREIGN PATENT DOCUMENTS

| | | |
|---|---|---|
| WO | 2015183558 A1 | 12/2015 |
| WO | 2017133432 A1 | 1/2017 |

OTHER PUBLICATIONS

Trevor Pering et al, CoolSpots: Reducing the Power Consumption of Wireless Mobile Devices with Multiple Radio Interfaces, ACM, 2006.

Bruno Fonzi, Notification Overload—Not only on your Smartphone, Salesforce Lightning Design System, 2014.

* cited by examiner

ADAPTIVE COMMUNICATION CONTROL DEVICE

BACKGROUND

A wide variety of computerized devices are available to users, including smart phones, tablets, laptop and desktop computers, home entertainment system (HES) devices (televisions, digital video recorders, programmable streaming service nodes and devices), Internet-of-Things (IoT) appliances (heating and cooling system thermostats, home lighting systems, refrigerators, kitchen appliances, door openers, security systems, etc.). It is common for an individual user to have more than one device, and for one household of users to have many.

Multiple, separate devices may be interconnected in order to exchange information via local area network (LAN), wide area network (WAN), Ethernet, WiFi, Bluetooth® and other communication systems and communications mechanisms and protocols, for example, via Transfer Control Protocol/Internet Protocol (TCP/IP) protocol communications. (BLUETOOTH is a trademark of Bluetooth Sig Inc. within the United States or other countries.) Users may configure the devices to interconnect within a trusted network, wherein they may freely share data files (including address book contacts, documents, spreadsheets and other database files, application files, and media files (music, picture, video), and access to system components (printers, wireless nodes, etc.).

SUMMARY

In one aspect of the present invention, a computerized method for controlling data transfers within a group of networked devices includes executing steps on a computer processor. Thus, a computer processor is configured to, in response to receiving a request to transfer a data item to each of a plurality of devices that are interconnected on a network, select one of the devices and assign a power value to the selected device that is indicative of a relative quality of a power supply to the device. The configured processor further assigns a connection value to the selected device that is indicative of a relative quality of network connections available to the selected device to communicate with others of the devices with respect to one or more connection availability, signal strength, cost, speed and security attributes. The configured processor also assigns a master state value to the selected device as a function of a comparing a historical usage data value generated for the selected device to usage data values generated for others of the devices. Thus, the configured processor sets the device with the highest combination value generated from assigned master state, power and connection values as a master device to receive the request to transfer the data item, and to transfer the data item to each of other ones of the devices that are not set as the master device as client devices relative to the master device.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to, in response to receiving a request to transfer a data item to each of a plurality of devices that are interconnected on a network, select one of the devices and assign a power value to the selected device that is indicative of a relative quality of a power supply to the device. The configured processor further assigns a connection value to the selected device that is indicative of a relative quality of network connections available to the selected device to communicate with others of the devices with respect to one or more connection availability, signal strength, cost, speed and security attributes. The configured processor also assigns a master state value to the selected device as a function of a comparing a historical usage data value generated for the selected device to usage data values generated for others of the devices. Thus, the configured processor sets the device with the highest combination value generated from assigned master state, power and connection values as a master device to receive the request to transfer the data item, and to transfer the data item to each of other ones of the devices that are not set as the master device as client devices relative to the master device.

In another aspect, a computer program product for controlling data transfers within a group of networked devices has a computer-readable storage medium with computer readable program code embodied therewith. The computer readable hardware medium is not a transitory signal per se. The computer readable program code includes instructions for execution which cause the processor to, in response to receiving a request to transfer a data item to each of a plurality of devices that are interconnected on a network, select one of the devices and assign a power value to the selected device that is indicative of a relative quality of a power supply to the device. The processor is further caused to assign a connection value to the selected device that is indicative of a relative quality of network connections available to the selected device to communicate with others of the devices with respect to one or more connection availability, signal strength, cost, speed and security attributes. The configured processor is also caused to assign a master state value to the selected device as a function of a comparing a historical usage data value generated for the selected device to usage data values generated for others of the devices. Thus, the configured processor is caused to set the device with the highest combination value generated from assigned master state, power and connection values as a master device to receive the request to transfer the data item, and to transfer the data item to each of other ones of the devices that are not set as the master device as client devices relative to the master device.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
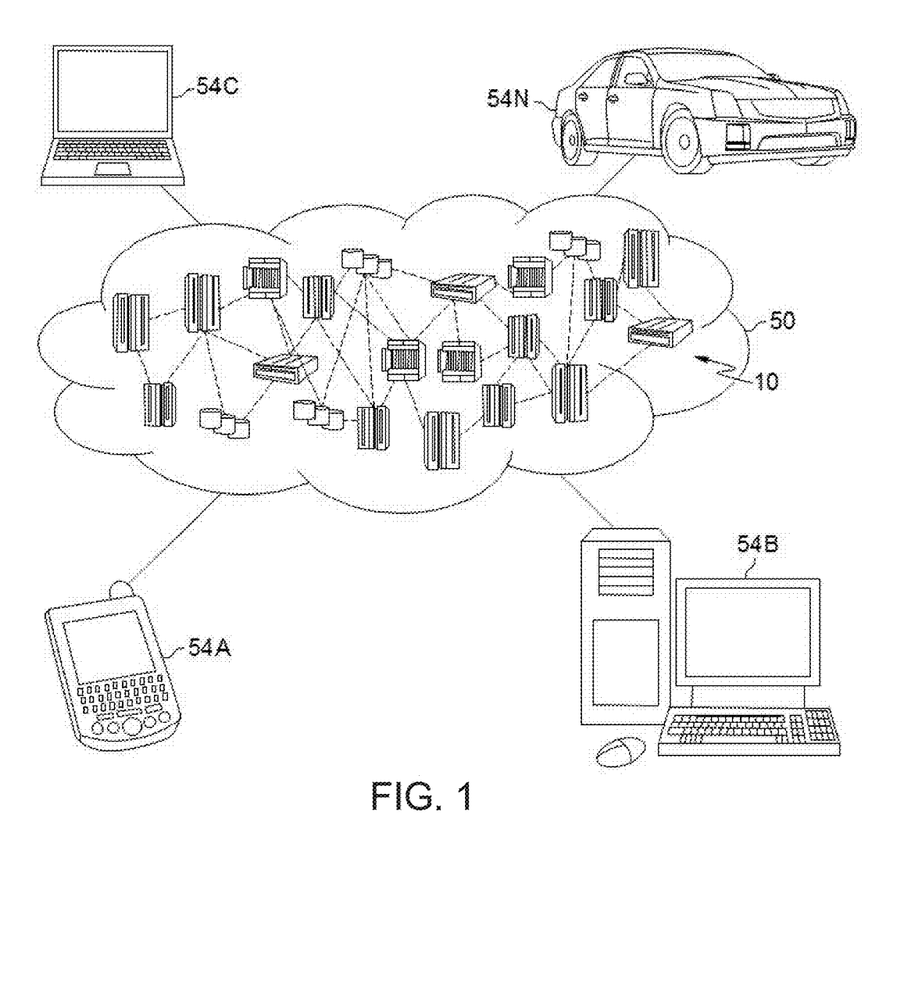
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
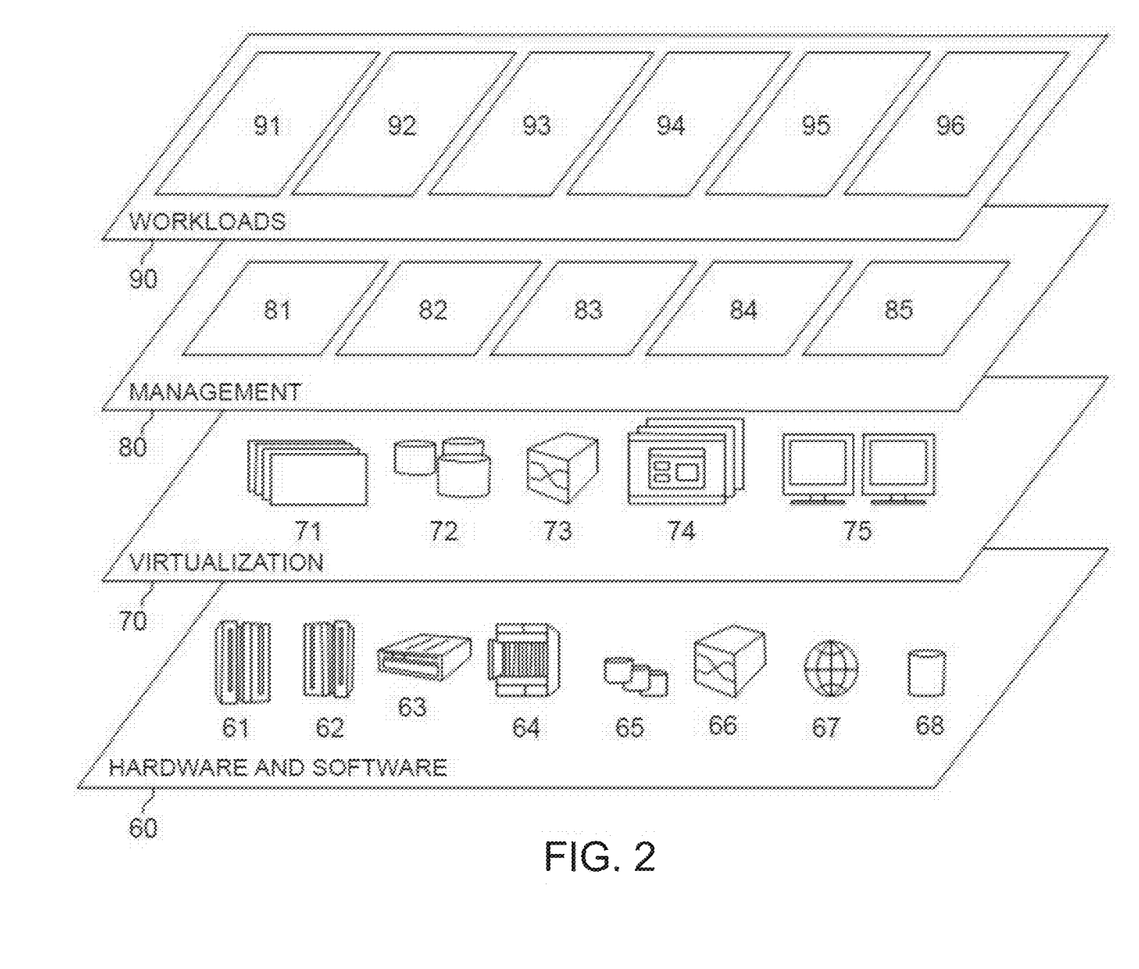
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for multi-tier data synchronization based on a concurrent linked monitor list 96.

Figure 3:
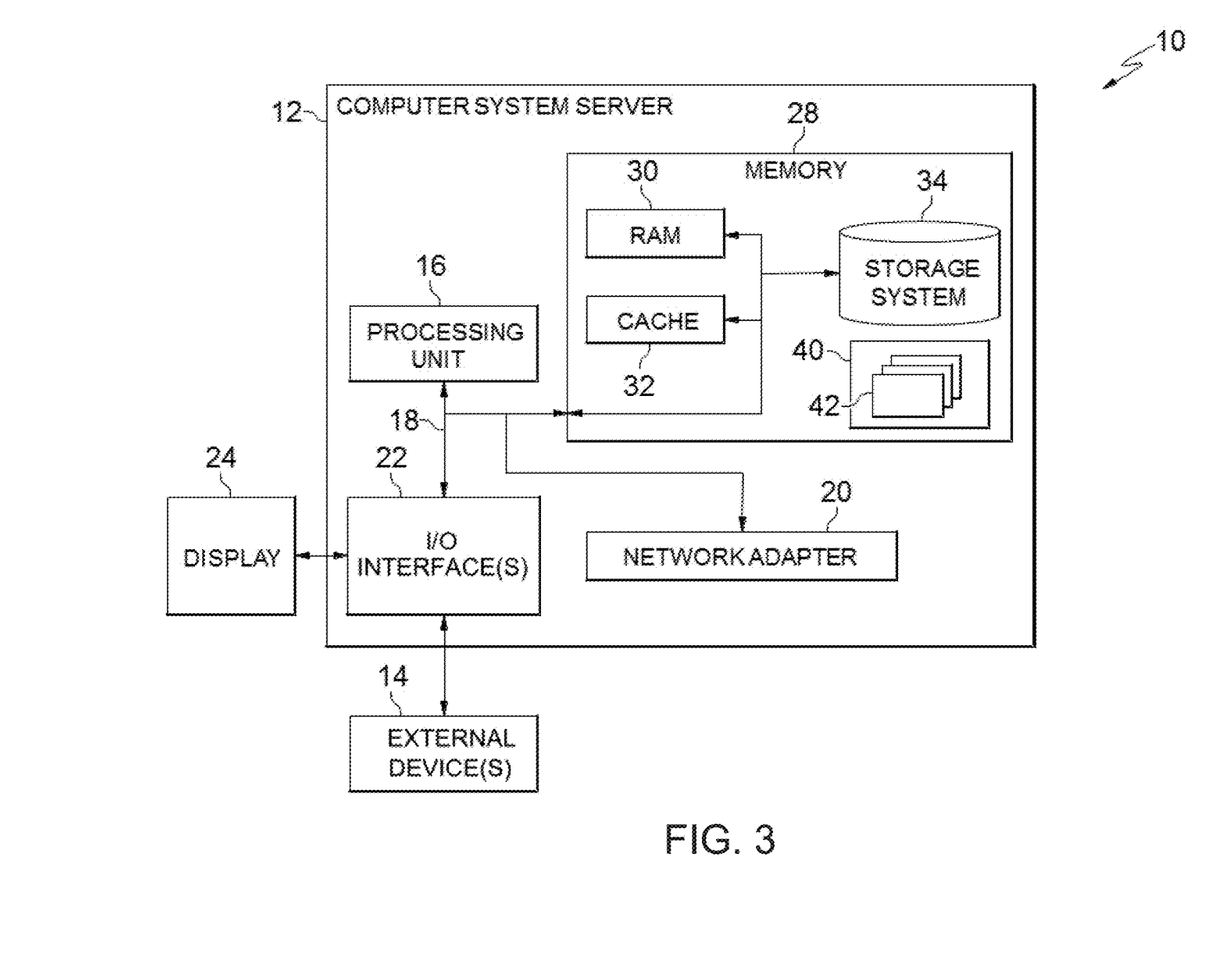
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

While it may be convenient for users to configure multiple different computerized devices to interconnect and communicate and share data files with each other within a trusted network, prior art systems and methods do not provide satisfactory mechanisms to control or prioritize specific data communications relative to certain devices. Generally, the user of the device, or the device itself, cannot control how or when data is exchanged with other devices. These deficiencies present a number of problems and inefficiencies, including increased user costs due to unnecessary cellular data usage for large file transfer operations when no-cost options are available, such as WiFi and BLUETOOTH. Executing data sharing operations between interconnected devices requires electrical energy, and therefore unnecessary or duplicative data operations impose energy costs or generate waste of energy resources, including energy stored on battery devices, which may further deplete battery life. Where multiple devices, or multiple applications on a device, receive a same message, multiple audible or visual notifications are generated and presented to users of the devices or applications, resulting in duplicative notifications that each require energy and processing resource expenditures, and user acknowledgement.

Figure 4:
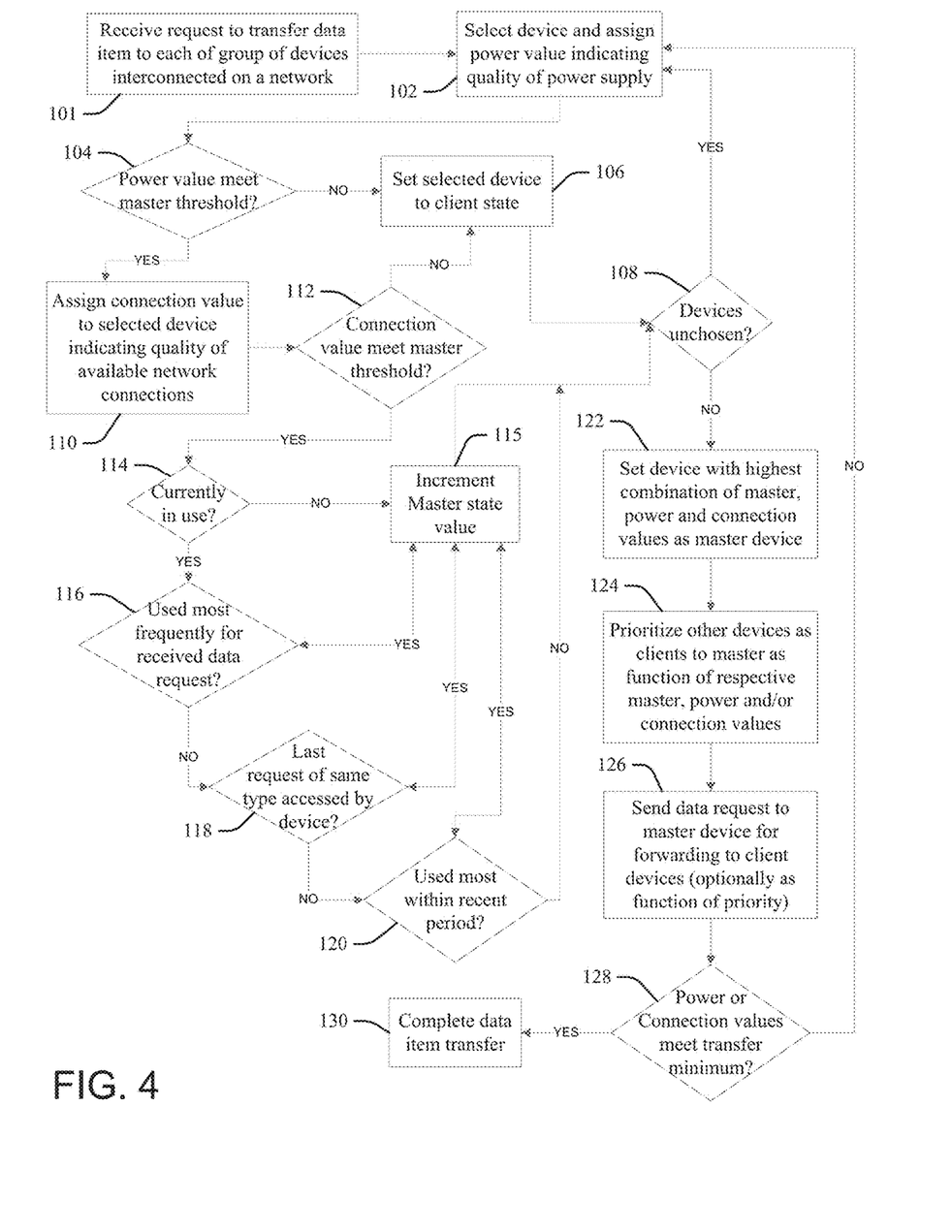
FIG. 4 is a flow chart illustration of an embodiment of the present invention.

FIG. 4 illustrates a process or system according to the present invention for controlling and sharing data transfers within a group of networked devices. In response to receiving a request 101 to transfer a data item (a file, a packet, etc.) to each of a group (plurality) of devices that are interconnected on a network, at 102 a processor that is configured according to an aspect of the present invention (the "configured processor") selects one of the devices and assigns a power value to the selected device indicating a relative quality of power supply to the device. The configured processor may be implemented in accordance with the computer system server 10 of FIG. 3, including as the cloud node 10 of FIG. 1, as described respectively above.

The configured processor executes the process steps of FIG. 4 described below to select a master device from the group of networked devices in response to each individual transfer request received at 101, thus in an iterative fashion with respect to different data item transfer requests. Examples of the data request include a software update file for an application executing on each device, a message to a messaging application running on each device, an alert notification packet to a calendar application running on each, etc. In one illustrative but not exhaustive example the configured processor assigns a high power value for a direct connection to a power supply, a medium power value for using battery power wherein the battery level is not low or likely sufficient to perform a task associated with the data transfer request (for example, enough power to execute an update with the received file, or more than a 20% or other low power indication threshold, etc.); and a low power value for using battery power wherein the battery level is low or likely insufficient to perform the task associated with the data transfer request.

At 104 the configured processor determines if the power value assigned to the selected device meets a minimum threshold criteria to enable the device to serve as a master for the data transfer request for the other devices (for example, is it not the low medium value?).

If the power value assigned to the selected device does not meets the minimum threshold criteria to enable the device to serve as a master for the data transfer request, at 106 the configured processor sets a state of the selected device for the data transfer request to a client state, and at 108 determines if any others of the group of devices have not yet been selected at 102. If others remain unselected, then the configured processor returns to 102 to review a next device of the group of devices that has not yet been selected at 102.

If the power value assigned to the selected device meets the minimum threshold criteria to serve as a master at 104, at 110 the configured processor assigns a connection value to the selected device indicating a relative quality of available network connections to the other group devices relative to any other, unavailable option, with respect to one or more of availability, signal strength, cost, speed and security attribute values or considerations.

Availability attributes comprehend binary values (yes or no, one or zero, etc.) that indicates the device is currently powered-up and in an operational state capable of functioning as a master for the data item transfer (for example, all applications are currently executing in a normal state with no unresolved error messages, or no application in a non-responsive state); or not. The availability attribute value may also be a percentage or likelihood confidence or value as to whether the device is likely/unlikely to serve as a master at a likely time of transfer of the data item to or from the device as a function of historic data: for example, the availability attribute value may be the percentage of times that the device was in the past always (or mostly or seldom or never) on and available during the same time period including the likely transfer time of the current data item (a date, end of quarter or month, day of week, portion of a work day (afternoon, after-hours), etc.

Signal strength attribute values comprehend binary decisions, or graduated values comparable to specified thresholds, that are indicative as to whether the desired, required or likely data communication links between the device as master and a source of the data item (for incoming transfer) and the other devices as clients will be reliable enough and of a sufficient bandwidth to execute the respective transfers within threshold quality benchmark, or without timing out before the transfers are complete.

Signal strength of the relevant network may be measured in decibel-milliwatts (dBm), the power ratio in decibels (dB) of the measured power as referenced to one milliwatt (mW), a standard commonly used in assessing the downlink signal strength to a mobile phone from a cellular network, as well as receivers of radio, microwave and fiber-optical network data communications. Signal strength may also be determined as Signal-to-Noise Ratio (SNR) value, the signal level (in dBm) minus the noise level (in dBm), and compared to one or more threshold values. For example, a signal level of −53 dBm measured near an access point and typical noise level of −90 dBm yields a SNR of 37 dB, a desired or adequate value of the device to serve as master with respect to the other devices as clients within a wireless local area network (LAN).

Aspects also assign cost attribute values to selected devices that are indicative of a financial or energy costs of network services available to the selected device to function as a master and to communicate with other devices, including relative to the different costs of other networks services that are available to the other devices but not to a selected device under consideration. In one example, the cost attribute value for a device is set to a low value if the selected device must use a cellular 3G/4G network to receive the item, or to transfer it to one of the other devices as a client; and instead to a high value if the device may use an available and open, no-cost WiFi network to execute the data item reception or transfer. Such valuations disfavor selection of devices that rely upon costlier cellular data services.

In some aspects, the configured processor only initiates communications via the master/client status definitions applied to the devices when user-defined cost thresholds are not exceeded. For example, a user may instruct the system (via preferences applied by the configured processor) to ensure that no transfer occurs over cellular networks (typically high cost networks), or that no transfer will occur over a cellular network of data files over a certain size (100 MB, 1 GB, etc.), and wherein the configured processor may further assign weightings to the relative cost attribute values of the different networks.

In one illustrative but not exhaustive example the configured processor assigns a high connection value for a default and available secure (private) network connection of a lowest energy or financial cost (for example, a free, private, firewall-protected Ethernet, WiFi or BLUETOOTH connection) and having a best or adequate bandwidth and/or data transfer rate characteristic (for example, it has a download rate in Megabytes/second that is high enough to be able to stream data associated with the data request received at 101); a medium connection value for an available unsecure (public) network connection of low energy or financial cost, and having adequate bandwidth or data transfer rate capacity; and a low connection value where only a cellular data connection is available, as use of the cellular data connection will result in consumption of limited data service allotments or direct financial cost to the user; or if the bandwidth or data transfer rate capacity is not adequate to meet the expected demands of processing the data request received at 101.

At 112 the configured processor determines if the connection value assigned to the selected device meets a minimum threshold criteria to enable the device to serve as a master for the data transfer request for the other devices (for example, is it not the lowest connection value?). If not, at 106 the configured processor sets the state of the selected device to a client state for the data transfer request, and at 108 determines if any others of the group of devices have not yet been selected at 102, returning to 102 for selection of a next device of the group if others remain unselected.

If the configured processor determines at 112 that the assigned connection value meets the minimum threshold criteria to serve as master for the data transfer request, the configured processor makes a series of usage pattern or quality determinations at 114, 116, 118 and 120, to thereby responsively determine a master state value for the selected device at 115 as a function of a comparing historical usage data for the selected device to usage data of others of the devices.

The present example comprises responsively incrementing (or not incrementing) a master state value for the selected device at 115 in response to each of different usage comparisons and/or determinations at 114, 116, 118 and 120. More particularly, at 114 the configured processor determines whether the selected device is currently in use with respect to executing processing operations that have a direct impact on the ability of the selected device to process the data request received at 101. In the present example, the configured processor increments the master state value at 115 in response to determining at 114 the that selected device is not currently in use, reflecting a policy choice that it is more favorable for setting the selected device to a master state relative to the other devices when the selected device does not have competing resources using processing power, memory or bandwidth allocated to the selected device. In other embodiments, an opposite determination is made at 114: incrementing the master state value at 115 in response to determining at 114 that the selected device is currently in use, reflecting a policy choice that it is more efficient with respect to time or energy to use a device already operating (not in a sleep or powered down state).

At 116 the configured processor determines as a function of policy or historic data whether the selected device is used most frequently for processing the data request received at 101. In the present example, the configured processor increments the master state value at 115 in response to determining at 116 that the selected device is used most frequently for processing the data request, reflecting a policy choice that it is therefore more likely that the device is the most appropriate device for processing the current request, relative to others within the group of devices. In other embodiments, an opposite determination is made at 114: incrementing the master state value at 115 in response to determining at 116 that the selected device is not used most frequently for processing the data request received at 101, reflecting a policy choice of more evenly distributing processing tasks among the group of devices, or avoiding over-reliance on a most-frequently used device.

At 118 the configured processor determines whether a most recent (last in time) data request of a same type of data request received at 101 was processed by the selected device. In the present example, the configured processor increments the master state value at 115 in response to determining at 118 that the selected device processed the most recent data request of the same type, reflecting a policy choice that it is therefore more likely that the selected device is the most appropriate one for selection for processing the data request received at 101 as a master device relative to the other devices. In other embodiments, an opposite determination is made at 118: incrementing the master state value at 115 in response to determining at 114 that the selected device did not process the most recent data request of the same type, reflecting a policy choice to more evenly distribute processing tasks among the group of devices, and/or avoid over-reliance on the last-used device, etc.

At 120 the configured processor determines whether the selected device was used the most (with respect to frequency of use, total time of use, total memory or bandwidth consumed by all processing tasks, etc.) within a recent period of time, relative to the other devices within the group. Any period of "recent time" may be used or specified by a service provider as useful for management of the group of devices, (five milliseconds, five seconds, one hour, 24 hours, etc.), as will be appreciated one skilled in the art. In the present example, the configured processor increments the master state value at 115 in response to determining at 120 that the selected device was used most frequently for processing the data request, reflecting a policy choice that it is therefore more likely that the device is the most appropriate device for processing the current request, relative to others within the group of devices. In other embodiments, an opposite determination is made at 120: incrementing the master state value at 115 in response to determining at 120 that the selected device was not used the most within the recent period of time, reflecting a policy choice of more evenly distributing processing tasks among the group of devices, or avoiding over-reliance on a most-frequently used device, etc.

In response to completing the four qualitative assessments at 114, 116, 118 and 120 (and appropriately incrementing or not incrementing the master state value respectively at 115), and to determining that none of the group of devices remain unselected at 102, at 122 the configured processor sets the device with the highest combination of master, power and connection values as the master device for processing the data request received at 101, and thereby to transfer the data item from the master device to the other devices as clients, wherein the other devices are designated as clients and thereby prevented from receiving transfer of the data item from other than the master device (thus, from a cellular service provider or other entity outside of the interconnected group of devices). As will be appreciated by one skilled in the art, variety of functions, score weightings and combination methods may be practiced in generating an overall score for use in selecting the master device at 122, and the present example is illustrative but not limiting or exhaustive.

At 124 the configured processor prioritizes the remaining devices for order of receiving transfer of the data item from the master device as client devices as a function of relative differences in their respective master, power and/or connection values.

At 126 the configured processor routes (sends) the data request received at 101 to the device of the group set as the master device at 122, for processing and forwarding the received request to the other, remaining devices of the group as "client" devices to the master device, as a function of any client priorities determined and assigned at 124.

At 128 the configured processor continually monitors the determined power and connection values (status) determined for the selected master device and the different respective client devices during the data item transfer process, in order to maintain a designation of one of the devices as a master device, or allow a transfer to move forward, for only as long as minimum relevant power and connection value criteria to complete the transfer(s) are met. Thus, the configured processor continually monitors or re-evaluates the power and connection status of the respective master and client devices during transfer of the data item, wherein a master device remains the master device until the transfer is completed at 130, or until such (intervening) time that conditions change as determined at 128, which leads to another iteration of the master selection process (via returning to step 102), which may lead to new, revised master and client designations to complete the transfer.

For example, the configured processor may monitor the signal quality attribute values at 128 of connections between the selected master device and the clients, or between the master and a source of the item, and allow a data transfer attempt in response to determining that the network connection used (or likely used) is of sufficient quality to ensure a successful transfer between the master device and all client devices.

The configured processor may also confirm at 128 that power on both sides of a data transfer (master/sender and client/receiver) is sufficient for a successful data transfer, to ensure that there is sufficient power available to all of the master and client devices in a given exchange. For example, a home entertainment system (HES) may be selected as master at 122 with respect to other devices linked within a home WiFi network in response to determining that the HES has a constant source of power, a reliable internet connection due to its reliable power and stationary position, and low cost network availability via the in-home WiFi. However, in response to a loss of power to the HES recognized by (signaled to) the configured processor, the configured processor determines at 128 that the HES can no longer remain or serve as a master device, revises its state to a client device, and triggers another iteration of the process at 102 to select a new master device, to promote another device from client to master.

Thus, aspects of the present invention provide system, processes and methods for adaptive device communication prioritization and control based on defined policies. Aspects govern and control how data is shared automatically between interconnected devices by applying rules to allow, prevent and control the communication of data between the devices as a function of relative differences in performance criteria of the devices that include the availability of power to each device, availability and accessibility of communications protocols and data processing and usage patterns. Policies are created and automatically implemented based on rules that define how control is executed. Once enabled or defined, aspects automatically apply and execute the policies, to thereby govern how data is exchanged between all interconnected devices within an ecosystem.

Aspects apply rules to determine if data communication should occur between devices based on available power, and the cost of communication; how data communication should occur (for example, which communication transport option to use between available WiFi, cellular, broadband or other options); when data will be communicated based on availability of power and availability of accessible networks; and a device hierarchy within an interconnected ecosystem that may be maintained and updated dynamically based on changes to device usage patterns, availability of power and availability of accessible communications networks. Aspects may thus suppress the broadcast of notifications across multiple devices when one device may service a master device on behalf of the other devices as clients.

Figure 5:
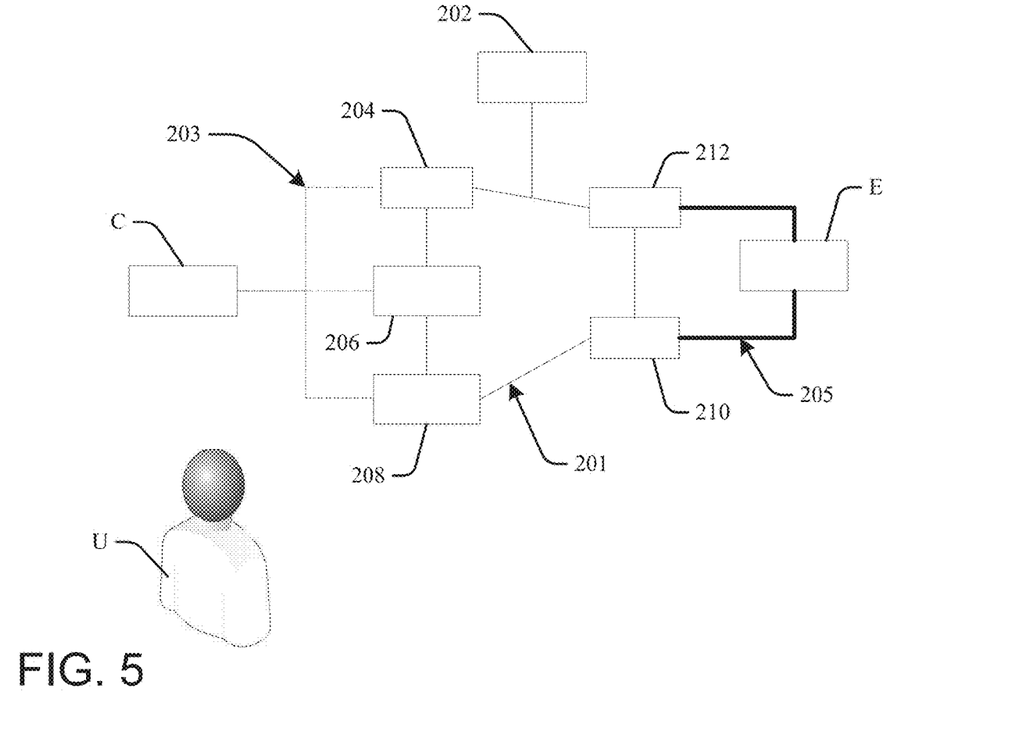
FIG. 5 is a block diagram illustration of an embodiment of the present invention.

FIG. 5 illustrates one example implementation of an aspect of the present invention, wherein two smart phones 204 and 206, a tablet 208, a laptop computer 210 and a home entertainment system (HES) 212 are interconnected to receive data communications with each other within a private, home WiFi network 201. Smart phones 204 and 206 and the tablet 208 are also enabled for cellular network communications 203 with a cellular data provider C. Each of the five devices 204, 206, 208, 210 and 212 is executing Applications X, Y and Z on their respective internal processors. Smart phone 204 is running on internal battery that is at 72% of its battery power capacity; smart phone 206 is running on an internal battery that is at 11% of its battery power capacity, and the tablet 208 is running on an internal battery that is at 3% of its battery power capacity. The laptop 210 and HES 212 are both plugged into a home electrical system E via wired plugs 205.

A processor configured according to the example of FIG. 4 discussed above (the "configured processor") 202 in circuit communication with the five interconnected devices 204, 206, 208, 210 and 212 determines a device hierarchy based on application of predefined rules and policies, and thereby sets one as a master device at a given point in time, wherein the rest are clients in relation to the master.

For example, in response to receiving a software update for Application X from a software provider (at 101, FIG. 4), the configured processor 202 executes the processes illustrated in FIG. 4 to select one of the devices 204, 206, 208, 210 and 212 as a master device to accept the software update over a most cost effective one of the available networks 201 and 203, and further prevents each device 204, 206, 208, 210 and 212 from individually downloading the same update from the same external provider. The configured processor 202 generally ensures that the one of the devices 204, 206, 208, 210 and 212 selected as master uses the home WiFi 201 to communicate the received Application X software update to each of the other, remaining ones of the devices 204, 206, 208, 210 and 212 as client devices to the master device within the WiFi network 201 ecosystem. This further ensures that none of the smart phones 204 and 206 and tablet 208 use the cellular network communications option 203 to individually (and thereby, unnecessarily in duplicate) obtain the software update from the cellular data provider C, avoiding the costs to the user U of the cellular services required to executed the download on the cellular network communications option 203.

In response to determining (at 102, FIG. 4) that the tablet 208 is on battery power, and (at 104, FIG. 4) that the battery level of 3% is not a high enough level of power reserves to receive and apply the software update, the configured processor 202 excludes the tablet 208 from consideration as the master device by setting its state to a client state (at 106, FIG. 4), and further assigns it a lowest priority value (at 124, FIG. 4) for receiving the update from a one of the devices 204, 206, 208, 210 and 212 that is ultimately selected as the master by the configured processor 202 (at 122, FIG. 4).

The configured processor 202 prioritizes (at 124, FIG. 4) smart phone 206 as the highest priority (first device) to update from the master (if smart phone 206 is not itself selected as master) in response to determining (at 102, FIG. 4) that it is running on internal power (it is not connected to perment power option E via a plug 205), and that it has less power (11%) than any other device also running on battery power (here, the other phone 204 that is running on battery power at 72% of capacity), and that this level is enough power (as determined at 104, FIG. 4) to receive and apply the update successfully.

The configured processor 202 prioritizes (at 124, FIG. 4) the other smart phone 204 as the second device (highest priority) in the update order in response to determining (at 101, FIG. 4) that the smart phone 204 is not connected to permanent power option E via a plug 205, but that it has more power reserve available relative to the power available to smart phone 206.

The configured processor 202 prioritizes (at 124, FIG. 4) the laptop 210 as the third device in the order, in response to determining (at 102, FIG. 4) that the laptop 210 has a usage pattern of frequently running off battery reserves despite being currently connected to a permanent power source E via the plug connection 205, and (at 110, FIG. 4) that the quality of the WiFi connection 201 to the laptop 210 is of a low, intermittent or otherwise relatively lower quality that the quality of the WiFi connection 201 determined for the HES 212.

The configured processor 202 prioritizes (at 124, FIG. 4) the HES 212 as the fourth in order, in response to determining (at 102, FIG. 4) that it is permanently connected to the power source E and will not rely on any internal battery (and thereby has the lowest relative risk of shutting down from lack of power prior to being served with the update by the master device), and (at 110, FIG. 4) that the quality of the WiFi connection 201 to the HES 212 is high quality and rarely disconnects from the network 201.

In another example, the configured processor 202 executes rules to determine an order for sharing a user video captured on smart phone 204 and received therefrom (at 101, FIG. 4) to share with the other devices 206, 208, 210 and 212. The configured processor 202 selects the smart phone 204 as the master (at 122) in response to determining (at 110, FIG. 4) that smart phone 204 will by default use the available WiFi network 201 to communicate to the other devices 206, 208, 210 and 212 (and not the available cellular data network 203 to communicate the video to the other smart phone 206 or the laptop 210). The configured processor 202 determines a priority order for the video transfer (at 124, FIG. 4) from the phone 204 as master that ranks the tablet 208 first in response to determining (at 104, FIG. 4) that it has relatively lower power reserves than the other cell phone 206, and that the 3% battery power level of the internal battery of the tablet 208 is sufficient power to enable the tablet 208 to successfully receive a transfer of the video file on the WiFi network 201. The configured processor 202 ranks the smart phone 206 second, the laptop 210 third, and the HES 212 fourth, via a similar analysis as discussed above with respect to the update example.

Designation of devices as client devices further disables audible and visual notifications on the client devices associated with the receipt of the data request at 101, wherein notices (and confirmations) may be efficiently provided by the master device of the group (as selected at 122). Aspects of the present invention cause the selected master to provide audible or visual notification of receiving the data of the request (software update, data files, etc.), and further to append notification information with data identifying all the other devices in the ecosystem that successfully receive the data from the master as client devices. This provides processing efficiencies over prior art techniques wherein each of the devices must individually generate and send acknowledgements of receipt of transfer of the date item to the sender of the item. It also reduces distractions and annoyance to the user caused by otherwise needing to acknowledge multiple individual notifications associated with each transfer of the item to each device, rather that only the one alert triggered by transfer to the master device.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling data transfers within a group of networked devices, comprising executing on a computer processor the steps of: integrating computer-readable program code into a computer system comprising a processor, a computer readable memory in circuit communication with the processor, and a computer readable storage medium in circuit communication with the processor; and the processor executing program code instructions stored on the computer-readable storage medium via the computer readable memory and thereby: in response to receiving a request to transfer a data item to each of a plurality of devices that are interconnected on a network, selecting one of the devices and assigning a power value to the selected device that is indicative of a quality of a power supply to the device; assigning a connection value to the selected device that is indicative of a quality of network connections available to the selected device to communicate with others of the devices with respect to a connection attribute that is selected from the group consisting of availability, signal strength, cost, speed and security; assigning a master state value to the selected device as a function of a comparing a historical usage data value generated for the selected device to usage data values generated for others of the devices; and setting a one of the devices that has a highest combination value generated from respective ones of the assigned master state value, power values and connection values as a master device to receive the request to transfer the data item and to transfer the data item to each of other ones of the devices that are not set as the master device as client devices relative to the master device.

2. The method of claim 1, further comprising:
generating the value for the historical usage data for the selected device from a determination selected from the group consisting of:
determining whether the selected device is currently in use;
determining whether the selected device is used most frequently for processing the received data request relative to others of the devices;
determining whether the selected device most recently processed a data request of a same type of the received data request relative to others of the devices; and
determining whether the selected device was used more for data processing within a recent period of time than all others of the devices.

3. The method of claim 1, wherein the computer-readable program code is provided as a service in a cloud environment.

4. The method of claim 1, further comprising:
designating the other ones of the devices that are not set as the master device as client devices of the master device with respect to transfer of the data item, wherein the client device designations prevent a transfer of the data to the client devices item from any other device that is not the master device.

5. The method of claim 4, further comprising:
designating the selected device as a client device in response to a threshold determination that is selected from the group consisting of determining that the power value of the selected device is likely insufficient to process the request to transfer the data item to the selected device, and determining that the connection attribute of the connection value assigned to the selected device does not meet a minimum connection threshold criteria.

6. The method of claim 4, further comprising:
disabling audible and visual notifications to a user from the client devices in response to receipt of the data item from the master device.

7. The method of claim 4, further comprising:
prioritizing the client devices for order of receiving transfer of the data item from the master device as a function of relative differences in their respective assigned master state values, power values and connection values.

8. The method of claim 7, further comprising:
prioritizing a first of the client devices over a second of the client devices in order for receiving transfer of the data item from the master device in response to determining that the power value of the first device is lower than the power value of the second device, and that the power value of the first device is sufficient to complete a transfer of the data item from the master device to the first client device.

9. The method of claim 7, further comprising:
prioritizing a third of the client devices over a fourth of the client devices in order for receiving transfer of the data item from the master device in response to determining that the fourth client device is connected to an external power source, that the connection value assigned to the fourth client device is a high value, and that the third client device is either not connected to an external power source or the connection value assigned to the third client device is not the high value.

10. A system, comprising:
a processor; a computer readable memory in circuit communication with the processor; and a computer readable storage medium in circuit communication with the processor; wherein the processor executes program instructions that are integrated into and stored on the computer-readable storage medium via the computer readable memory and thereby controls data transfers within a group of networked devices by:
in response to receiving a request to transfer a data item to each of a plurality of devices that are interconnected on a network, selecting one of the devices and assigns a power value to the selected device that is indicative of a quality of a power supply to the device;
assigning a connection value to the selected device that is indicative of a quality of network connections available to the selected device to communicate with others of the devices with respect to a connection attribute that is selected from the group consisting of availability, signal strength, cost, speed and security;
assigning a master state value to the selected device as a function of a comparing a historical usage data value generated for the selected device to usage data values generated for others of the devices; and
setting a one of the devices that has a highest combination value generated from respective ones of the assigned master state value, power values and connection values as a master device to receive the request to transfer the data item and to transfer the data item to each of other ones of the devices that are not set as master device as client devices relative to the master device.

11. The system of claim 10, wherein the processor executes the program instructions stored on the computer-readable storage medium via the computer readable memory and thereby generates the value for the historical usage data for the selected device from a determination selected from the group consisting of:
determining whether the selected device is currently in use;

determining whether the selected device is used most frequently for processing the received data request relative to others of the devices;

determining whether the selected device most recently processed a data request of a same type of the received data request relative to others of the devices; and determining whether the selected device was used more for data processing within a recent period of time than all others of the devices.

12. The system of claim 10, wherein the processor executes the program instructions stored on the computer-readable storage medium via the computer readable memory and thereby further designates the other ones of the devices that are not set as the master device as client devices of the master device with respect to transfer of the data item, wherein the client device designations prevent a transfer of the data to the client devices item from any other device that is not the master device.

13. The system of claim 12, wherein the processor executes the program instructions stored on the computer-readable storage medium via the computer readable memory and thereby further designates the selected device as a client device in response to a threshold determination that is selected from the group consisting of determining that the power value of the selected device is likely insufficient to process the request to transfer the data item to the selected device, and determining that the connection attribute of the connection value assigned to the selected device does not meet a minimum connection threshold criteria.

14. The system of claim 12, wherein the processor executes the program instructions stored on the computer-readable storage medium via the computer readable memory and thereby further disables audible and visual notifications to a user from the client devices in response to receipt of the data item from the master device.

15. A computer program product for controlling data transfers within a
group of networked devices, the computer program product comprising:
a computer readable storage medium having computer readable program code integrated thereon and thereby embodied therewith, wherein the computer readable storage medium is not a transitory signal per se, the computer readable program code comprising instructions for execution by a computer system processor that is in circuit communication with a computer readable memory and a computer readable storage medium that cause the processor to execute the program code instructions stored on the computer-readable storage medium via the computer readable memory and thereby controls data transfers within a group of networked devices by:
in response to receiving a request to transfer a data item to each of a plurality of devices that are interconnected on a network, select one of the devices and assign a power value to the selected device that is indicative of a quality of a power supply to the device;
assign a connection value to the selected device that is indicative of a quality of network connections available to the selected device to communicate with others of the devices with respect to a connection attribute that is selected from the group consisting of availability, signal strength, cost, speed and security;
assign a master state value to the selected device as a function of a comparing a historical usage data value generated for the selected device to usage data values generated for others of the devices; and
set a one of the devices that has a highest combination value generated from respective ones of the assigned master state value, power values and connection values as a master device to receive the request to transfer the data item and to transfer the data item to each of other ones of the devices that are not set as the master device as client devices relative to the master device.

16. The computer program product of claim 15, wherein the computer readable program code instructions for execution by the processor further cause the processor to generate the value for the historical usage data for the selected device from a determination selected from the group consisting of:

determining whether the selected device is currently in use;

determining whether the selected device is used most frequently for processing the received data request relative to others of the devices;

determining whether the selected device most recently processed a data request of a same type of the received data request relative to others of the devices; and determining whether the selected device was used more for data processing within a recent period of time than all others of the devices.

17. The computer program product of claim 15, wherein the computer readable program code instructions for execution by the processor further cause the processor to designate the other ones of the devices that are not set as the master device as client devices of the master device with respect to transfer of the data item, wherein the client device designations prevent a transfer of the data to the client devices item from any other device that is not the master device.

18. The computer program product of claim 17, wherein the computer readable program code instructions for execution by the processor further cause the processor to designate the selected device as a client device in response to a threshold determination that is selected from the group consisting of determining that the power value of the selected device is likely insufficient to process the request to transfer the data item to the selected device, and determining that the connection attribute of the connection value assigned to the selected device does not meet a minimum connection threshold criteria.

19. The computer program product of claim 17, wherein the computer readable program code instructions for execution by the processor further cause the processor to disable audible and visual notifications to a user from the client devices in response to receipt of the data item from the master device.

* * * * *